Aug. 10, 1965 G. DE BOER 3,199,195
CHEESE MOLD APPARATUS
Filed Dec. 4, 1963
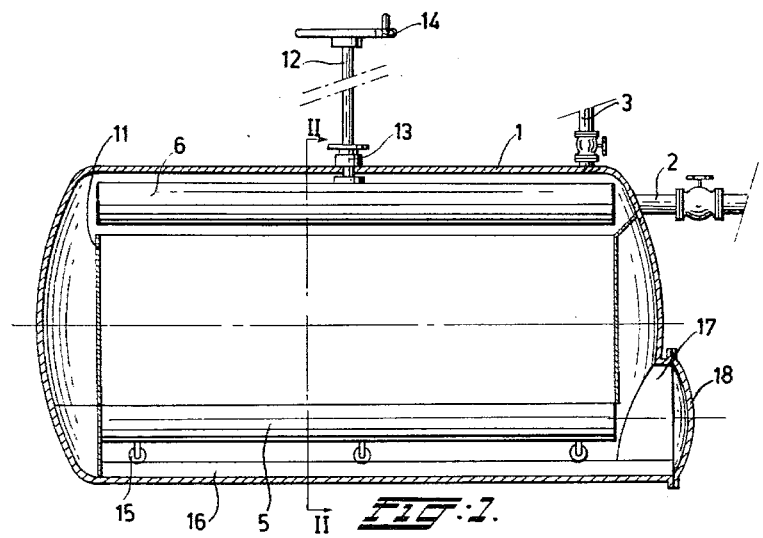
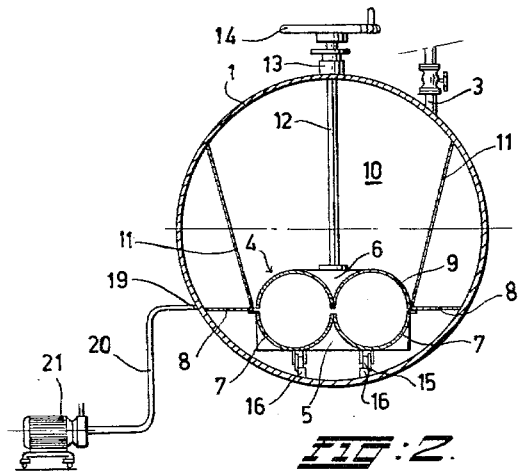

United States Patent Office 3,199,195
Patented Aug. 10, 1965

3,199,195
CHEESE MOLD APPARATUS
Geert de Boer, Lippenhuizen, Netherlands, assignor to N.V. Velma, Gorredijk, Netherlands, a Netherlands limited-liability company
Filed Dec. 4, 1963, Ser. No. 328,078
Claims priority, application Netherlands, Dec. 10, 1962, 286,481
3 Claims. (Cl. 31—44)

The invention relates to a method for the manufacture of pre-formed pieces of curd starting from curd which has already been prepared, said curd being pressed into a mould. Such a method is known as practiced in various embodiments according to which in most cases one or two treatment phases precede the so called filling or stuffing process of the cheese in a separately arranged stuffing trough. During the transport of the whey/curd mass from the cheese tub there can easily develop air inclusion in the cheese, the air getting between the curd particles in the stuffing trough.

It is an object of the invention to provide a method in which this inconvenience of air inclusion, if any, is avoided to the best possible purpose, whereby it is feasible to make hard cheese.

A further object consists in applying a sub-atmospheric pressure in order to stimulate the expelling of possible gas in the curd. Due to the escape of any quantities of gas from the whey/curd mass, this mass can be pre-formed into compact pieces of curd, into which no air can penetrate during filling in the stuffing trough.

It should be noted that the application of an underpressure in cheese making is known in itself. This underpressure is applied during coagulating and cutting of the curd in order to loosen the same, whereupon the material with the aid of the whey is further conveyed in order to prepare a soft cheese like camembert.

The invention has as a further object providing an installation for the application of the method referred to hereinbefore, the said installation comprising a vessel provided with an inlet for the prepared curd and with a connection for an air suction duct.

The invention will hereinafter be described with reference to the drawing in which an embodiment of the invention is illustrated.

In the drawing:

FIG. 1 shows a longitudinal section of an embodiment according to the invention, and FIG. 2 is a cross section taken along the line II—II in FIGURE 1.

The apparatus comprises a vessel or container 1, which is provided with an inlet 2 for the prepared curd and a connection 3 for a suction duct. Provided within the container 1 is a device 4 for pre-pressing and pre-forming the material, the said device consisting of two complementary parts 5 and 6, of which part 5 is composed of two semicylindrical bows 7, which on either side merge into a base plate 8. The part 6 consists of two complementary semicylindrical bowls 9 of perforated material. Part 6 is displaceable in an upward direction within a space 10 in the container 1, which is limited by a perforated inner casing 11. This movable arrangement is achieved through the intermediary of a threaded rod 12 which by way of a packing 13 protrudes from the container and which on its extremity is provided with a handwheel 14.

The part 5 of the device 4 for pre-pressing and pre-shaping is arranged in the container so as to be capable of travel. For that purpose part 5 is provided with a number of wheels 15 which can roll on rails 16, secured on the bottom of the container 1. On its front side the container is provided with a discharge opening 17, which can be closed by a cover 18. The opening is adapted to the dimensions of the movable part 5, so that this part, in a filled condition, can be wheeled outside of the container through the opening 17. The container 1 is further provided with a discharge aperture 19 for the whey, which by way of a duct 20 is drained by a pump 21.

The operation of the installation and consequently the realization of the method according to the invention is effected as described hereinafter. The already prepared curd is introduced into the container 1 by way of the inlet 2. The part 6 of the device 4 for pre-compressing and pre-shaping is in its elevated position, as represented in FIG. 1. After the space 10 has been filled to a definite level, the inlet 2 is closed, whereupon by way of the suction connection 3 an underpressure is generated in the interior of the container 1. The gases in the curd are thereby expelled via the connection 3. When this process of expelling the gases has continued for a sfficiently long time, the part 6 of the pre-compressing and pre-forming device 4 is lowered by means of the hand wheel 14, while the curd mass in the space 10 is simultaneously compressed. This compression is continued until the semicylindrical bowls 9 of the part 6 join the complementary bowls 7 of the part 5 (See FIG. 2). The quantity of whey produced during this phase can be discharged by the pump 21 via the perforations in the bowls 9 and the inner casing 11 and via the aperture 19. In this way a compact curd cake, into which the air cannot penetrate, is obtained between the bowls 7 and 9.

After the eduction of the whey from the container 1 the part 6 is again elevated by means of the hand wheel 14. Hereupon the underpressure is neutralized and the cover 18 is removed, after which the pre-formed pieces of curd, resting on the part 5, can be wheeled outwardly through the opening 17. The pieces are then cut up to a convenient size and conveyed to a stuffing trough.

It should be noted that within the scope of the invention the embodiment described of the installation can be modified or amplified. Thus, for instance, it is possible that subsequent to the process of pressing the prepared curd into the desired shape the moulded pieces may be divided into measured slices within the container 1 during the period of reduced pressure. Instead of the manufacture of two mouldings at the same time also one moulding or a greater number of mouldings can be produced in one operative cycle.

Compression of the curd within the container 1 can also be effected by means of one or more plungers, fitting in cylindrically shaped pre-compressing and pre-forming devices. In the latter embodiment these plungers may be utilized for discharging the pre-shaped pieces of curd.

Represented in the figures is an installation which is substantially horizontally arranged. A vertical embodiment is, however, also possible. All embodiments are especially adapted to the manufacture of hard cheese in which it is essential to avoid the development of air inclusion.

It should be further noted that the generation of an underpressure in the container 1 by way of the suction duct 3 may also precede the supply of the prepared curd by way of the inlet 2. In this case the conveyance of the whey/curd mass can be effected without necessity of a pump.

What I claim is:

1. Apparatus for the manufacture of pre-formed pieces of curd from curd out of which the whey has been substantially eliminated, said apparatus comprising a stationary vessel providing an enclosed chamber having an inlet for the introduction of a mass of curd, means in said vessel for receiving the mass of curd and for compressing the mass into a desired compressed shape, the later means including at least two elements between which the mass is introduced, said elements being supported for relative movement for compressing the mass therebetween, means including an outlet conduit coupled to the vessel for establishing suction therewithin to enable the mass to be compressed while simultaneously being subjected to suction for the removal of gas from said mass, said vessel having an outlet through which one of said elements is displaceable with the compressed mass supported thereon, and means for displacing the said one element in a direction normal to the direction of relative movement between said elements for discharging said one element with the compressed mass therewith from the vessel and for returning the said one element into the vessel when the latter has been emptied of the compressed mass, said vessel having an outlet for moisture which is extracted from the mass of curd during compression thereof.

2. Apparatus as claimed in claim 1 comprising casing means within the vessel defining together with said elements a chamber in which the mass of curd is originally received, said casing means being perforated to establish communication between the aforesaid chamber and the outlet for moisture to permit moisture removed from the compressed mass to be discharged from the latter said outlet.

3. Apparatus as claimed in claim 1 wherein said one element is perforated and permits removed gas from said mass to be discharged from the outlet conduit.

References Cited by the Examiner

UNITED STATES PATENTS

| | | | |
|---|---|---|---|
| 2,851,776 | 9/58 | Czulak et al. | 31—44 |
| 2,884,694 | 5/59 | Hannon et al. | 31—44 |
| 3,041,153 | 6/62 | Elder et al. | 31—89 |

SAMUEL KOREN, *Primary Examiner.*

HUGH R. CHAMBLEE, *Examiner.*